3,682,631
METHOD OF FORMING AN ELECTROPHOTOGRAPHIC LAYER CONTAINING A BENZOGUANAMINE RESIN BINDER
Satoru Honjo, Asaka, Japan, assignor to Xerox Corporation, Stamford, Conn.
No Drawing. Filed Dec. 28, 1970, Ser. No. 102,091
Int. Cl. C03g 5/08
U.S. Cl. 96—1.7                                   10 Claims

ABSTRACT OF THE DISCLOSURE

A photosensitive member which includes a binder layer consisting of photoconductive particles dispersed in a resin matrix. The binder layer is formed by applying a binder coating mixture made up of finely-divided photoconductor particles, an alkyd resin, and a methanol modified benzoguanamine resinous material to a supporting substrate to form a binder layer. The binder layer is then cured at a temperature between about 80 and 100° C. to cause a condensation reaction between the alkyd and benzoguanamine resins.

BACKGROUND OF THE INVENTION

This invention relates to xerography, and in particular, to a novel photosensitive device and the method of making the device.

The present invention is broadly directed to a xerographic device employing a photoconductive binder layer which is characterized by finely-divided photoconductor particles homogeneously dispersed in a film forming resin. One example of a commercial embodiment of a device of this type comprises finely-divided particles of photoconductive zinc oxide dispersed in a film forming insulating resin contained on a paper backing. This concept is more fully described in U.S. Pat. 3,121,006 to Middleton et al. In a preferred embodiment, and in order to extend the spectral sensitivity of binder layers of the type described above, the photoconductive zinc oxide may be dye-sensitized with a suitable organic dye.

Some applications of these binder layers require sufficient resistance to heat and high mechanical strength. In these applications, it is therefore required that the binder layer use a cured resinous material having a three dimensional molecular network. In addition, cured or hardened resinous materials are preferred in that they exhibit superior properties during electrophoretic development in that such layers exhibit a remarkable electrostatic charge retaining capability in a variety of carrier liquids which are used for liquid developers. Typical examples of hardened or cured resinous materials suitable for use in binder structures of the type described above employ resins selected from alkyds, unsaturated polyesters, or epoxy esters comprising unsaturated fatty acids which are crosslinked by oxygen in the presence of heavy metal salt catalysts such as cobalt or lead naphthenate and/or organic peroxide. The oxygen curing of these resins is characterized by a relatively mild curing condition in the vicinity of 40 to 50° C. and the resulting cured layer has a desirable degree of flexibility. Such curing, however, is objectionable in that the oxidizing catalyst mentioned above will decompose most of the organic dyestuff adsorbed on the photoconductive particles. Therefore, this method may not be conventionally applied to spectrally dye-sensitized electrophotographic layers. Alkyd resins are also known to be curable with melamine-formaldehyde and urea-formaldehyde resins, but in such cases, severe curing temperatures of at least 150° C. are required. Under such conditions ordinary paper, which is the most common supporting material for such binder layers, will discolor or decompose, and in addition, most organic dyestuffs cannot withstand such conditions and undergo a decomposition. An alternative approach to avoid the disadvantages of the above two methods involves curing with polyisocyanate. This approach, however, requires an elaborate choice of solvent which is necessary to prepare the coating mixture, and is therefore an impractical alternative for most commercial applications.

OBJECTS OF THE INVENTION

It is, therefore, an object of this invention to provide a novel photosensitive member and method which overcome the above noted disadvantages.

It is a further object of this invention to provide a novel photoconductive binder layer having excellent electrical characteristics and which is especially suited to providing a layer which incorporates an organic sensitizing dye.

It is a further object of this invention to provide a photosensitive binder layer containing an organic dye which is susceptible to elevated temperatures as well as oxidizing agents and processing.

It is another object of this invention to provide an electrophotographic layer which is adapted for use in liquid development and which exhibits superior mechanical strength.

SUMMARY OF THE INVENTION

These and other objects of the instant invention are accomplished by applying a binder coating mixture comprising a finely-divided inorganic photoconductor, an alkyd resin, and a methanol modified benzoguanamine resinous material to form a binder layer, and maintaining the coated layer at an elevated temperature between about 80 and 110° C. until a condensation reaction proceeds between the alkyd and the benzoguanamine resins.

DETAILED DESCRIPTION OF THE INVENTION

As stated above, the instant invention involves coating onto a support member, a coating mixture comprising a finely-divided inorganic photoconductor, an alkyd resin, and a methanol modified benzoguanamine-formaldehyde resin, and heating the coated layer to effect a condensation reaction between the two resinous materials. It should be understood that any alkyd resin may be used for the present invention. These include drying oil or nondrying oil modified resins with arbitrary oil length, styrene modified resins, phenol and phenol-formaldehyde modified resins. The methanol modified benzoguanamine resin is synthesized by condensing benzoguanamine and formaldehyde, and further modifying with methanol to form methylol derivatives of the condensation product.

The coating mixture may be formed on any suitable substrate. Preferred substrates include thin flexible supports such as paper, plastic, or thin metal foil. It should be understood, however, that the support may be of any convenient thickness, rigid or flexible, and may be in any desired form, such as a sheet, web, plate or drum. It may comprise a metal such as brass, aluminum, steel, nickel; or other materials such as metallized paper, plastic sheets coated with a thin layer of metal such as aluminum or copper iodine; or glass coated with a thin layer of a metal such as chromium or tin oxide.

The benzoguanamine resin of the instant invention differs from prevailing butanol modified melamine-formaldehye resins in their compatibility with other resins and in the curing conditions used to effect condensation with alkyd resins. For example, the former is compatible with styrene modified alkyd resins while the latter is not.

Layers produced in accordance with the invention as described above do not decompose organic dyestuffs, which are added in order to increase the spectral sensitivity of the binder layer. In addition, the electrophotographic properties of the binder layers of the present invention are kept stable and unchanged for relatively long periods of storage time and/or use.

Curing of alkyd resins with methylol benzoguanamine resin can be accomplished by keeping the coated layer containing these resins at about 80° C. for one or two hours or at about 100° C. for twenty minutes, resulting in an electrophotographic layer which can retain an electrostatic charge for long periods of time in various organic liquids including those having a relatively high dissolving power such as Decalin, cyclohexane, kerosene, or mixtures of aliphatic hydrocarbons with minor amounts of aromatic hydrocarbons. Variations in the curing time and temperature falling within the above range may be made by those skilled in the art.

Various inorganic photoconductors may be used in the present invention and include without limitation, zinc oxide, zinc sulfide, cadmium sulfide, cadmium sulfoselenide, titanium dioxide, and many others. The above-mentioned U.S. patent, 3,121,006 to Middleton et al. provides a more complete listing of suitable photoconductive materials which may be used in this invention, and the disclosure of these photoconductors is incorporated herein by reference. Similarly, many organic dyes, dyestuffs or spectral sensitizers may be incorporated in the layers prepared in accordance with the instant invention and include those described in patent specifications; U.S. 3,132,942; U.S. 3,110,591; U.S. 3,125,447; and Japanese patent publications 37–9543 and 33–3917.

In general, binder layers of the instant invention should contain about 40 to 70 percent by volume of the photoductor in order to give optimum electrical characteristics. Many inorganic photoconductors have densities of about 4 to 6 and accordingly, 100 parts per weight of the photoconductor may be mixed with about 5 to 30 parts by weight of the resinous binder to give a desired ratio of photoconductor to resin binder material. It should be understood that in the above ratios, the proportion of resin binder material is represented by the sum of the alkyd and methylol benzoguanamine resins.

In general, the ratio of the alkyd and benzoguanamine resins should be from about 80:20 to 40:60 by weight. When a medium oil length alkyd is used, incorporation of a large amount of benzoguanamine resin is advantageous in enhancing light sensitivity and curing conditions. In general, curing can be accomplished by heating to about 100° C. for twenty minutes, in which case discoloration of the paper support or decomposition of the organic dye can be avoided. Certain dyestuffs can only withstand temperatures up to about 90° C., but the majority of dyes can withstand curing conditions of about 80° C. for one to several hours or at about 100° C. for 30 to 40 minutes.

DESCRIPTION OF THE PREFERRED EMBODIMENTS

The following examples further define the present invention with respect to a method of making and testing a novel photoconductive binder layer. The percentages in the disclosure, examples and claims are by weight unless otherwise indicated. The following examples are intended to illustrate various preferred embodiments of the instant invention.

Example I

A mixture of 100 parts by weight of photoconductive zinc oxide, 10 parts by weight of linsed oil modified medium oil length alkyd resin varnish (oil length 51 percent, non-volatile content 50 percent, mineral spirit solvent), and 9 parts by weight of methylol benzoguanamine-formaldehyde resin varnish (non-volatile content 55 percent, xylol-butanol solvent) are blended in a homogenizer for 20 minutes with 30 parts by weight of toluene. The alkyd resin is available from Tokushima Refining Oil Co. under the tradename "Tokushinol 1130," and the benzoguanamine resin available from Nippon Catalyst Chemicals, Inc. under the tradename "Amicoat BG–600." The resultant homogeneous dispersion is uniformly spread over one side of a machine coated paper, which is subbed with a conductive barrier coat, by means of a wire-wound coating rod to give a dried binder layer coating thickness of about 8 microns. The coated sheet is then placed in an oven held at 100° C. for 40 minutes, and then dark-adapted. The dark-adapted sheet is subjected to negative corona charging, and exhibits a potential acceptance of 250 volts. This value decreases only by 5 percent in one minute dark storage under an environment of 60 percent relative humidity at room temperature.

Measurement of charge attenuation under darkroom conditions is carried out using the application of purified Decalin (having a volume resistivity higher than $10^{15}$ ohms-cm.) as a thin film over the binder coating. This experiment shows that no acceleration of dark decay occurs by the presence of the liquid film. It can therefore be seen that the charge retaining property of the binder coating in insulating liquids is excellent and that the binder coating is quite suited for liquid development.

Example II

A second imaging member is prepared as follows:
Three spectral sensitizers are added in the form of a methanol solution to the coating mixture prepared by the method described in Example I.

|  | Parts by weight |
|---|---|
| Fluorescein (C.I. 45,350) | 5/1000 |
| Erthrosine (C.I. 45,350) | 9/1000 |
| Brillian Blue FCF (C.I. 42,900) | 5/1000 |

Coating and drying are carried out by the method of Example I. Curing of the binder is accomplished by heating at 100° C. for 20 minutes.

The following electrophotographic characteristic values are obtained:

| | |
|---|---|
| Potential acceptance ___volts__ | 250 |
| Potential residual ratio after one minute dark decay in air ___percent__ | 90 |
| Potential residual ratio after one minute dark decay in purified Decalin ___do____ | 60 |
| Potential residual ratio after one minute dark decay in purified isoparaffinic ___do____ | 95 |

The spectral reflectance curve of the layer before and after the curing treatment is substantially equal, showing that the sensitizers are not adversely effected by the curing.

Example III

A third imaging member is prepared by the method of Example II except that styrene modified alkyd resin varnish "Styresol 4250" available from Japan Reichhold Chemical Ind., (xylol solvent non-volatile content 50 percent) is used in place of the "Tokushinol 1130." The electrical characteristics obtained are similar to those obtained for the imaging member of Example II.

Example IV

A fourth imaging member is prepared by the method of Example II except that the coating mixture comprises 100 parts of zinc oxide, 15 parts of Styresol 4350, and 4.6 parts of Amicoat BG–600. Coating, drying, and curing are carried out as in Example II. The imaging member exhibits electrical characteristics similar to those of Example II.

Example V

A fifth imaging member is prepared by the method of Example I except that cadmium yellow ($2CdS \cdot 3CdCO_3$) is used in place of the zinc oxide. The imaging member exhibits electrical characteristics similar to those of Example I.

Although specific components and proportions have been stated in the above description of the preferred embodiments of this invention, other suitable materials and procedures such as those listed above, may be used with similar results. In addition, other materials and changes may be utilized which synergize, enhance, or otherwise modify the photosensitive member.

Other modifications and ramifications of the present invention would appear to those skilled in the art upon reading the disclosure. These are also intended to be within the scope of this invention.

What is claimed is:

1. A method of making a photosensitive member which comprises forming a coating mixture made up of finely-divided dye sensitized photoconductor particles, an alkyd resin, and a methanol modified benzoguanamine resin which has been synthesized from benzoguanamine and formaldehyde, coating said mixture onto a supporting substrate to form a layer of substantially uniform thickness, followed by heating said layer to a temperature between about 80 and 110° to cause a condensation reaction between said alkyd and benzoguanamine resins.

2. The method of claim 1 in which the photoconductor comprises at least one material selected from the group consisting of zinc oxide, zinc sulfide, cadmium sulfide, cadmium sulfoselenide, titanium dioxide and mixtures thereof.

3. The method of claim 1 in which the photoconductor comprises zinc oxide.

4. The method of claim 1 in which the ratio of the alkyd to benzoguanamine resin is from about 80:20 to 40:60 by weight.

5. The method of claim 1 in which the substrate comprises paper.

6. A photosensitive member which includes a supporting substrate, a photoconductive binder layer comprising dye sensitized photoconductive particles dispersed throughout a resin matrix overlaying said substrate, said matrix comprising the condensation reaction product of an alkyd resin and a methanol modified benzoguanamine resin which has been synthesized from benzoguanamine and formaldehyde.

7. The member of claim 6 in which the ratio of the alkyd to benzoguanamine resin is from about 80:20 to 40:60 by weight.

8. The member of claim 6 in which the substrate comprises paper.

9. The member of claim 8 in which the photoconductor comprises zinc oxide.

10. The member of claim 6 in which the photoconductor comprises at least one material selected from the group consisting of zinc oxide, zinc sulfide, cadmium sulfide, cadmium sulfoselenide, titanium dioxide and mixtures thereof.

References Cited

UNITED STATES PATENTS

| | | | |
|---|---|---|---|
| 2,959,481 | 11/1960 | Kucera | 96—1 |
| 2,997,387 | 8/1961 | Tanenbaum | 96—1 |
| 3,345,162 | 10/1967 | McFarlane et al. | 96—1.8 |
| 2,218,474 | 10/1940 | Moore | 260—15 |
| 2,579,980 | 12/1951 | Spencer | 260—45.3 |

JOHN C. COOPER III, Primary Examiner

U.S. Cl. X.R.

96—1.5, 1.8; 252—501; 260—850